(12) United States Patent
Davis et al.

(10) Patent No.: US 7,930,740 B2
(45) Date of Patent: Apr. 19, 2011

(54) SYSTEM AND METHOD FOR DETECTION AND MITIGATION OF DISTRIBUTED DENIAL OF SERVICE ATTACKS

(75) Inventors: John F. Davis, Durham, NC (US); Kevin D. Himberger, Durham, NC (US); Clark D. Jeffries, Chapel Hill, NC (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1623 days.

(21) Appl. No.: 11/176,079

(22) Filed: Jul. 7, 2005

(65) Prior Publication Data

US 2007/0011740 A1  Jan. 11, 2007

(51) Int. Cl.
*G06F 11/00* (2006.01)
(52) U.S. Cl. ......................................... 726/22
(58) Field of Classification Search ............... 726/13, 726/22–25
See application file for complete search history.

(56) References Cited

U.S. PATENT DOCUMENTS

| | | | | |
|---|---|---|---|---|
| 4,872,160 | A * | 10/1989 | Hemmady et al. ............ | 370/353 |
| 5,488,412 | A * | 1/1996 | Majeti et al. .................. | 725/111 |
| 5,757,795 | A * | 5/1998 | Schnell ......................... | 370/392 |
| 6,088,804 | A | 7/2000 | Hill et al. ...................... | 713/201 |
| 6,343,362 | B1 | 1/2002 | Placek et al. .................. | 713/201 |
| 6,477,651 | B1 | 11/2002 | Teal .............................. | 713/201 |
| 6,502,135 | B1 | 12/2002 | Munger et al. ................ | 709/225 |
| 6,584,569 | B2 | 6/2003 | Reshef et al. ................. | 713/201 |
| 6,640,248 | B1 | 10/2003 | Jorgensen ..................... | 709/226 |
| 6,708,218 | B1 | 3/2004 | Ellington, Jr. et al. ........ | 709/236 |
| 6,715,083 | B1 | 3/2004 | Tovander ...................... | 713/201 |
| 6,725,378 | B1 | 4/2004 | Schuba et al. ................ | 713/201 |
| 6,735,702 | B1 | 5/2004 | Yavatkar et al. .............. | 713/201 |
| 6,738,814 | B1 | 5/2004 | Cox et al. ...................... | 709/225 |
| 6,751,668 | B1 | 6/2004 | Lin et al. ....................... | 709/227 |
| 6,772,332 | B1 * | 8/2004 | Boebert et al. ................ | 713/153 |
| 6,772,334 | B1 * | 8/2004 | Glawitsch ..................... | 713/153 |
| 2002/0031107 | A1 * | 3/2002 | Li et al. ......................... | 370/338 |
| 2003/0043745 | A1 * | 3/2003 | Kano et al. .................... | 370/238 |
| 2003/0051026 | A1 * | 3/2003 | Carter et al. .................. | 709/224 |
| 2003/0152081 | A1 * | 8/2003 | Soderberg et al. ............ | 370/393 |

(Continued)

FOREIGN PATENT DOCUMENTS

CA   2287824 A1   4/2000

(Continued)

OTHER PUBLICATIONS

Martin Krzywinski, "Port Knocking—Network Authentication Across Closed Ports", Jun. 2003, www.sysadminmag.com, pp. 12-17.*

(Continued)

*Primary Examiner* — Kimyen Vu
*Assistant Examiner* — John B King
(74) *Attorney, Agent, or Firm* — John R. Pivnichny; Law Office of Jim Boice

(57) ABSTRACT

A router includes a relatively low bandwidth communication connection to a small computer, a relatively high bandwidth communication connection to a communication network; and a processing unit for executing in the router a set of permit rules for permitting flow of communication packets with respect to the connections for user initiated sessions, the permit rules including a default rule for discarding all packets with respect to the small computer in traffic not pertaining to sessions initiated by the small computer.

3 Claims, 11 Drawing Sheets

SMALL SCALE ATTACK

U.S. PATENT DOCUMENTS

| | | | |
|---|---|---|---|
| 2003/0208616 A1* | 11/2003 | Laing et al. | 709/236 |
| 2004/0170123 A1 | 9/2004 | Carpenter et al. | 370/229 |
| 2005/0005017 A1* | 1/2005 | Ptacek et al. | 709/229 |
| 2005/0216954 A1* | 9/2005 | Ramaiah et al. | 726/22 |
| 2007/0044155 A1* | 2/2007 | Pletka et al. | 726/25 |

FOREIGN PATENT DOCUMENTS

| | | |
|---|---|---|
| WO | 0205514 A1 | 1/2002 |
| WO | WO03025697 A2 | 3/2003 |

OTHER PUBLICATIONS

"Denial of Service Attacks: An Emerging Vulnerability for the "Connected" Network", 1999, SonicWALL.*

Berlind, David. "How to shore up your defenses against a Mini-DDoS attack" *Tech Update Security* Mar. 25, 2004. 3 pages. [Accessed at http://techupdate.zdnet.com/techupdate/stories/main/defenses_against_MDDoS_attacks.html on Sep. 27, 2004].

Berlind, David. "In search of a cure for DDoS attacks" *Tech Update Security* Mar. 18, 2004. 4 pages. [Accessed at http://techupdate.zdnet.com/techupdate/stories/main/In_serach_of_a_cure_for_DDoS_attacks_.html on Sep. 27, 2004.].

"Connected: An Internet Encyclopedia—CP Header Format" [Accessed at http://www.freesoft.org/CIE/Course/Section4/8.htm. before Nov. 3, 2004.].

Summary of Prior Art Listed by China Patent Office.

* cited by examiner

OSI ARCHITECTURE

SMALL SCALE ATTACK

MEDIUM SCALE ATTACK

SYSTEM AND METHOD FOR DETECTION AND MITIGATION OF DISTRIBUTED DENIAL OF SERVICE ATTACKS

TECHNICAL FIELD OF THE INVENTION

This invention relates to Internet technology, and more particularly to the detection and mitigation of denial of service (DoS) and distributed denial of service (DDOS) attacks directed to the home or small business computer user.

BACKGROUND ART

A home or small business computer user may be targeted for a distributed denial of service (DDOS) attack by just about any other Internet user to whom the IP address of the home or small business computer is exposed.

Unlike other Internet vulnerabilities like viruses and spam, heretofore there have been no patches, personal firewalls, or other technical measures that business or individuals using DSL or cable mode-based Internet connections can take that will guarantee or more surely secure immunity from such attacks.

It is known that a DDOS attack against the IP address of a home or small business computer or network can effectively disconnect all users at that address. Tools to launch such an attack against any low bandwidth IP address ("broadband connection" over DSL or cable) are readily available on the Internet. The bandwidth needed is below that of interest to Internet service providers (ISPs), and the amount of resulting monetary damages generally lower than that required to secure the interest and assistance of local or federal authorities.

Low bandwidth, directed attacks could be a significant risk to telecommuters. Since the congestion is severe at the user, too many packets are dropped to continue normal TCP sessions. A home firewall is not the answer. A home firewall could block malicious packets or unwanted packets from an end user. The problem is that in a DDOS attack, there is too much traffic reaching the end user. Thus, there is so much traffic that the end user cannot deal with the inbound flood of traffic that will be eventually blocked by the home firewall. So while the firewall attempts to work, it cannot handle all of the traffic. This causes legitimate connections to be severed or never initiated.

SUMMARY OF THE INVENTION

A system, method, and computer program product for detecting and mitigating denial of service attacks responsive to a user initiating a small computer communication session through a router on a communication network, executing in the router a set of permit rules for permitting flow of communication packets for user-initiated sessions through the router, the permit rules including a default rule for discarding all packets with respect to the small computer in traffic not pertaining to sessions initiated by the user.

Other features and advantages of this invention will become apparent from the following detailed description of the presently preferred embodiment of the invention, taken in conjunction with the accompanying drawings.

DETAILED DESCRIPTION OF BEST MODE

In accordance with the present invention, enhanced filtering within a next hop router and an enhanced ISP edge router is provided for mitigating DDOS attacks against a low bandwidth connected home or small business computer. The solution is largely automatic in the sense of not requiring ISP or user initiation or management.

Figure 1:
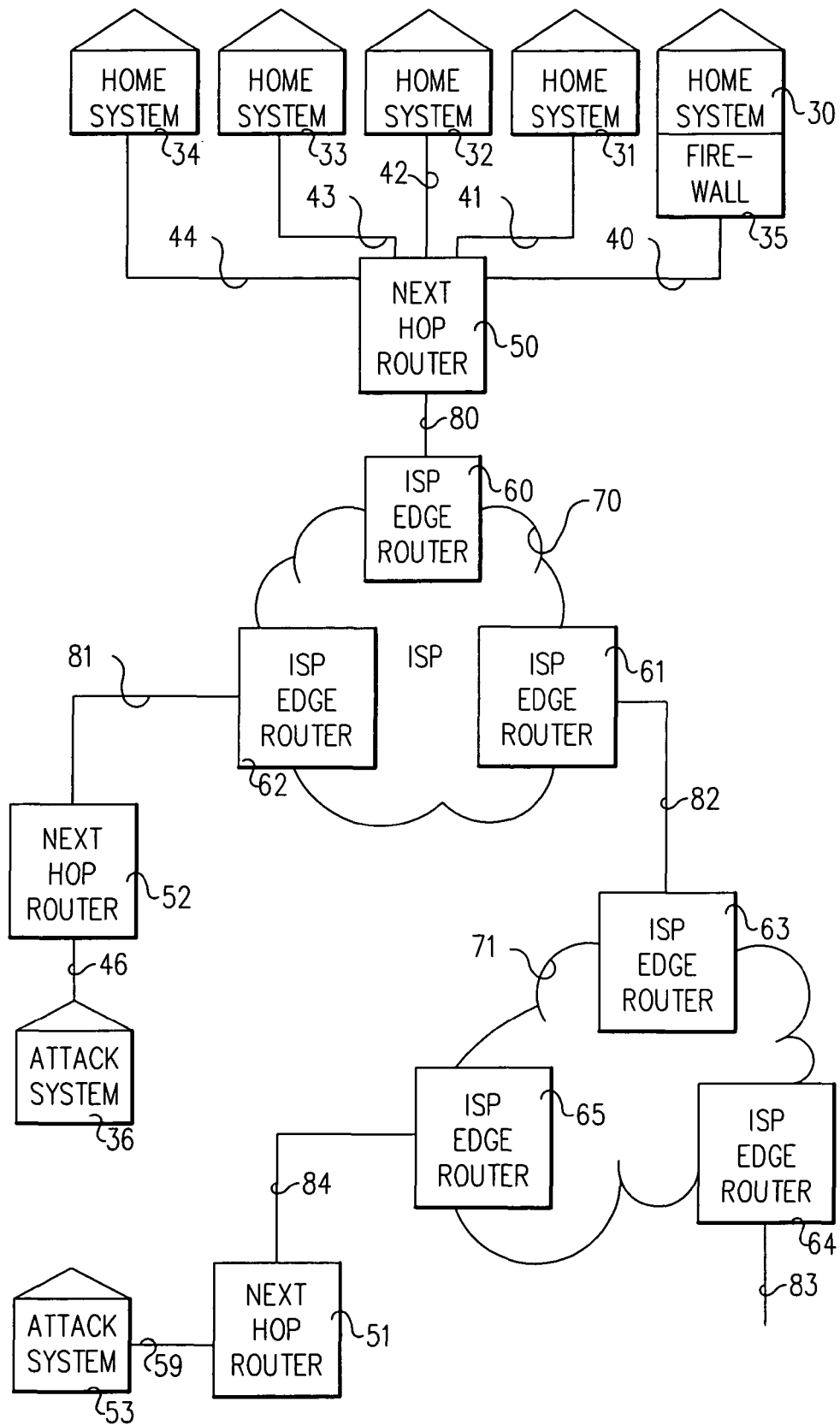
FIG. 1 is a high level system diagram illustrating simple configuration of components of a system useful for the purpose of describing aspects of the invention.

Referring to FIG. 1, broadband home or small business may be laid out in a typical configuration, with home or small business client or user computers 30-34 connected to a next hop router 50 over medium bandwidth links 40-44, respectively. A firewall 35 is shown installed on client 30. Next hop router 50 is shown connected by a high bandwidth link 80 to ISP edge router 60 on communication cloud 70, on which further ISP edge routers 61, 62 are also connected. (A cloud represents an Internet, intranet, or some such wired or wireless communication network interconnecting a plurality of devices.) These further ISP edge routers are connected by further high bandwidth connections 81, 82 to further ISP clouds, such as cloud 71 through ISP edge router 63, or to next hop routers such as router 52 and thence to a client 36 over medium bandwidth connection 46. Cloud 71 also is connected via ISP edge routers 64, 65 over high bandwidth links 83, 84 to further next hop routers 51 and thence over medium bandwidth links 59 to additional home or small business client computers such as attack system 53. In accordance with this exemplary embodiment there may be a plurality of distinct levels of bandwidth, each level represented by, for example, a link 40, 80, 70, 82, 71, 84, 59, and so on.

In accordance with the preferred embodiment of the present invention, most sessions involving a home or small business computer 30 are or become user-initiated. If so, then a set of access control rules are established on next hop router 50. These rules are specific rules permitting the flow of packets through next hop router 50 in both directions with respect to home or small business computer 30 if initiated by the user (of computer 30). For example, most or all TCP sessions would be initiated by a SYN packet from user 30 (described hereafter in connection with FIG. 4). As another example, a UDP audio session would be mainly in the direction to user 30 and would be initiated by user 30. The default inbound (toward user 30 from next hop router 50) rule is to discard all other packets (those not resulting from a session initiated by user 30). Likewise, only outbound (from user 30) traffic that is in sessions initiated by user 30 would be permitted. Permit rules timeout after a span of time, determined after a transaction concludes. Length of time could depend also upon session length or other factors.

In the above described embodiment, only user 30 initiated sessions are permitted. This is a brute force permit or deny mechanism. In order to provide increased flexibility to accommodate some networking services as well as remote administration, in accordance with a further exemplary embodiment of the invention, a mechanism is provided for allowing a trusted computer to access user computer 30. This further mechanism is implemented based upon a port knocking algorithm described hereafter. In this case, a second computer 36 attempts to contact user computer 30 with packets directed to a secret sequence of exotic port numbers (such as ten port numbers having values less than 2047) known to computers 30 and 36, and router 50. Because such attempts from computer 36 are not computer 30 initiated, router 50 denies connection until the sequence of ports is detected by router 50 which, upon recognizing the secret sequence as having been followed concludes that computer 36 is a trusted computer. Thereupon router 50 may allow user computer 30 to open an exotic port and allow communication to proceed with computer 36 over that port until both parties agree to terminate the session.

In addition to administration signaling, the correct sequence in a port knock may be used by user 30 to authorize an FTP or Telnet transaction with trusted computer 36 based upon a current source address and source port of the trusted computer. Thus, port knocking may be used to allow certain users 36 to connect to user 30 where normally only user 30 initiated network traffic is permitted.

The bandwidth from next hop router 50 to ISP edge router 60 needs to be high enough, and generally is, so that in a small-scale DDOS attack against user 30, all or almost all packets (normal and malicious) arrive at next hop router 50. Also, next hop router 50 needs to have sufficient processing capacity to permit normal packets associated with a permit list to remain in sessions initiated by user 30 while dropping all others.

Ideally, malicious traffic is dropped close to a source, say computer 36. However, in a small-scale DDOS attack originating at, for example, attack system 36, bandwidth on link 81 may be too small to be noticed by an ISP 70. Consequently, DDoS traffic in a small-scale attack will be completely conveyed from computer 36 through ISP 70 to next hop router 50. This ensures that packets in ongoing sessions would not be dropped while traversing ISP cloud 70. At next hop router 50, permit rules for inbound (to user 30) traffic based upon sessions initiated by user 30 are enforced along with a default discard action.

For higher bandwidth DDOS attacks, bandwidth intensity would be noticeable by ISP 70 and could impact other customers 31-34 on the same next hop router 50. In such a case, identification of DDOS entering ISP 70 could be effected with consequent discard actions. Essentially, the next hop router 50 for 31-34 becomes the end user, that is, relatively speaking, a small computer. The edge router 60 (or next hop router from the original next hop router) then becomes the next hop router. The same concept of only allowing user-initiated sessions to take place is applied, and since the edge router will be capable of much higher bandwidths it is more apt to deal with DDOS attacks. ISPs existing defenses against DDOS attacks become more and more effective as the size of the DDOS attack increases, so the present invention combined with those existing technologies makes an excellent security process. This illustrates how the present invention could be used at a higher level.

To enhance security, care is taken to record the location from which traffic originates (typically a physical port or enforcement module). This effectively halts any chance of spoofing the source of traffic to client 30 on next hop router 50 from a machine 36 that is not a client of next hop router 50. This also prevents any of the clients 31-34 of next hop router 50 from engaging in spoofing of client 30. These clients 31-34, 36 must use the addresses assigned to them from their respective ISPs. Since sessions are initiated by the end users, the only external connections allowed are those established or approved by the end user. This means that if any spoofing is attempted, that particular connection will not be allowed in (by next hop router 50). Also, if the end user 30 attempts to spoof traffic, that will also be blocked because the next hop router, in this case router 50, knows what addresses are allocated to systems 31-34 and it also knows the physical port on which traffic enters the router box 50.

Figure 2:
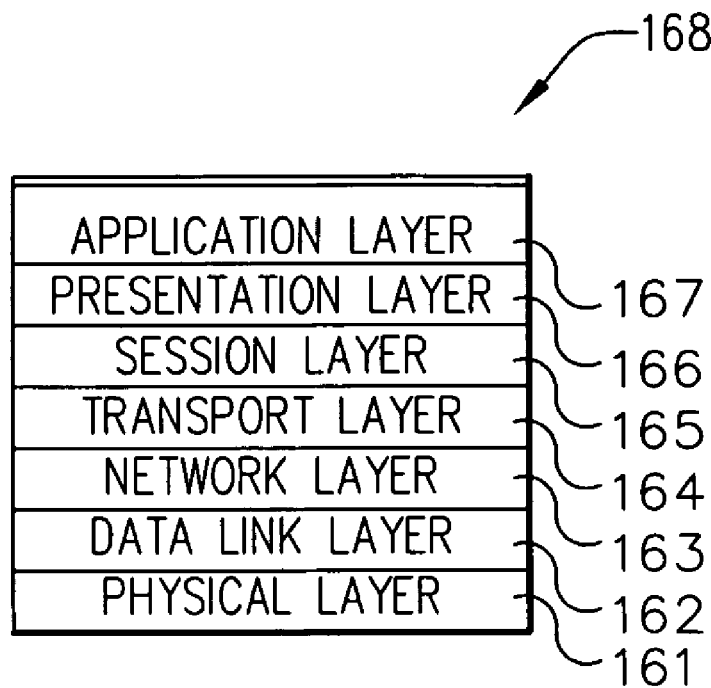
FIG. 2 is a diagrammatic representation of a layered architecture.

Referring to FIG. 2, the OSI model, or architecture, provides at a node 168 a (1) physical layer 161, (2) data link layer 162, (3) network layer 163, (4) transport layer 164, (5) session layer 165, (6) presentation layer 166, and (7) application layer 167. Other similar layered architectures may be used for structuring communication between devices. These establish a framework for coordinating the development of current and future standards for the interconnection of computer systems. Network functions are divided, in the case of the OSI model, into seven layers, each layer representing a group of related data processing and communication functions that can be carried out in a standard way to support different applications. It is a characteristic of such architectures that communications between devices are conducted at the same layer. Thus, the data link layer in one device communicates with the data link layer in the other device, the session layer in the one with the session layer in the other, and so forth.

Figure 3:
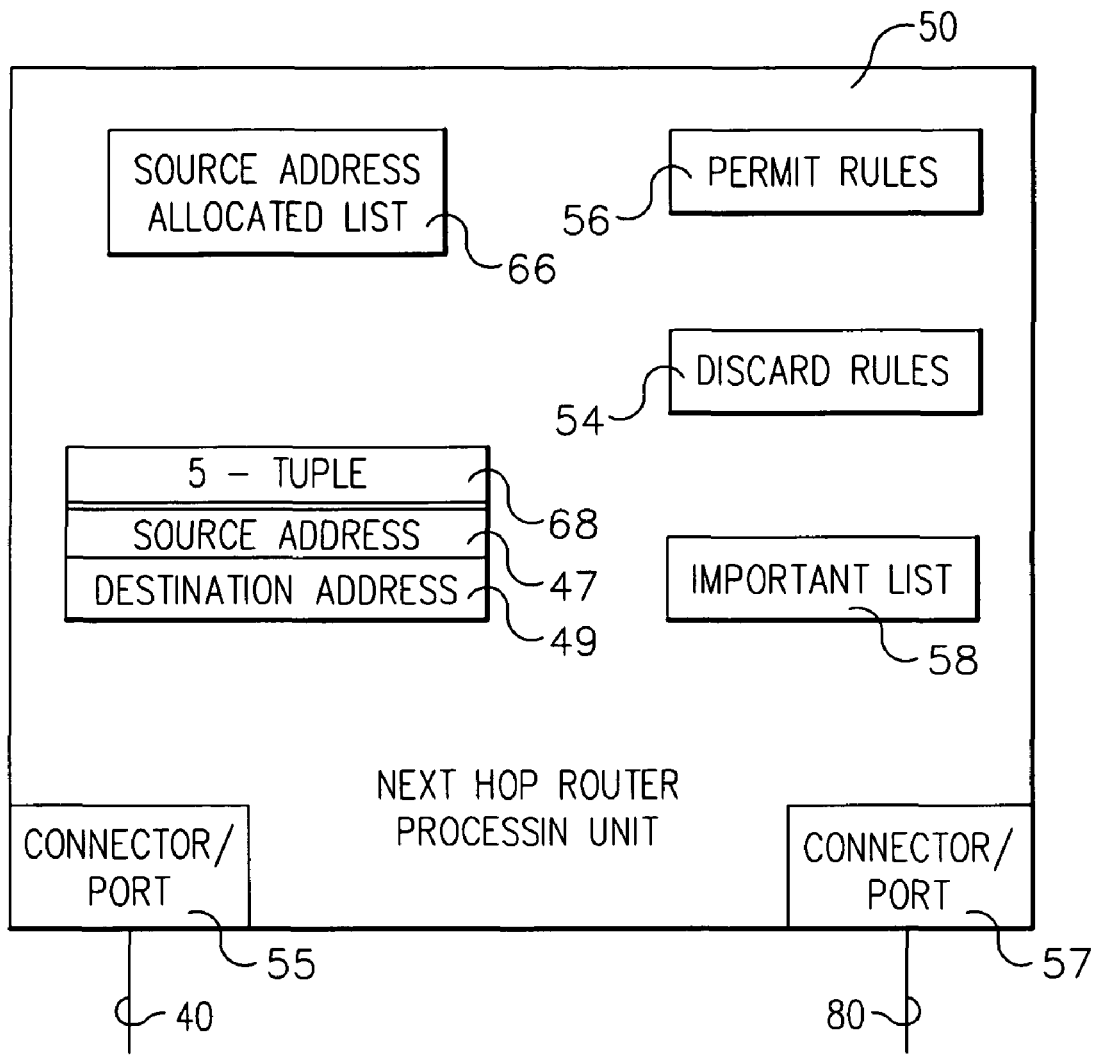
FIG. 3 is a diagrammatic representation of selected components of the next hop router of FIG. 1.

Referring to FIG. 3, selected components of next hop router 50 of interest to the present invention include variables, registers, or components including source address allocated list 66, connector ports 55, 57 to communication links 40, 80, respectively, permit rules 56, discard rules 54, important list 58, and 5-tuple 68, which includes source IP address 47, destination IP address 49, source port, destination port, and protocol.

Figure 4:
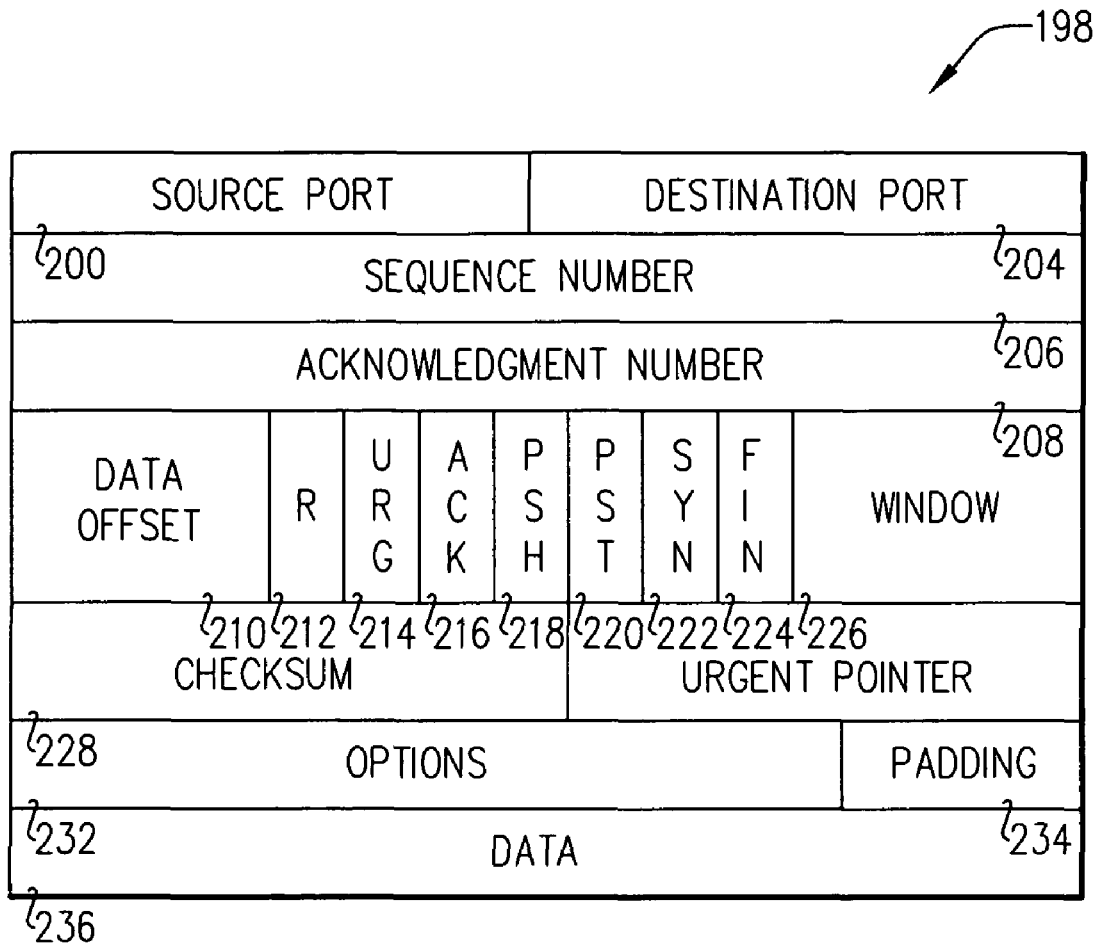
FIG. 4 is a diagrammatic representation of a Transmission Control Protocol (TCP) header.

Referring to FIG. 4, a TCP header includes source port 200, destination port 204, sequence number 206, acknowledgment number 208, data offset field 210, reserved field 212, six status bits including urgent (URG) 214, acknowledge (ACK) 216, PSH 218, PST 220, synchronize (SYN) 222, and finish (FIN) 224; window 226, checksum 228, urgent pointer 230, options field 232, padding 234, and finally data 236.

Figure 5:
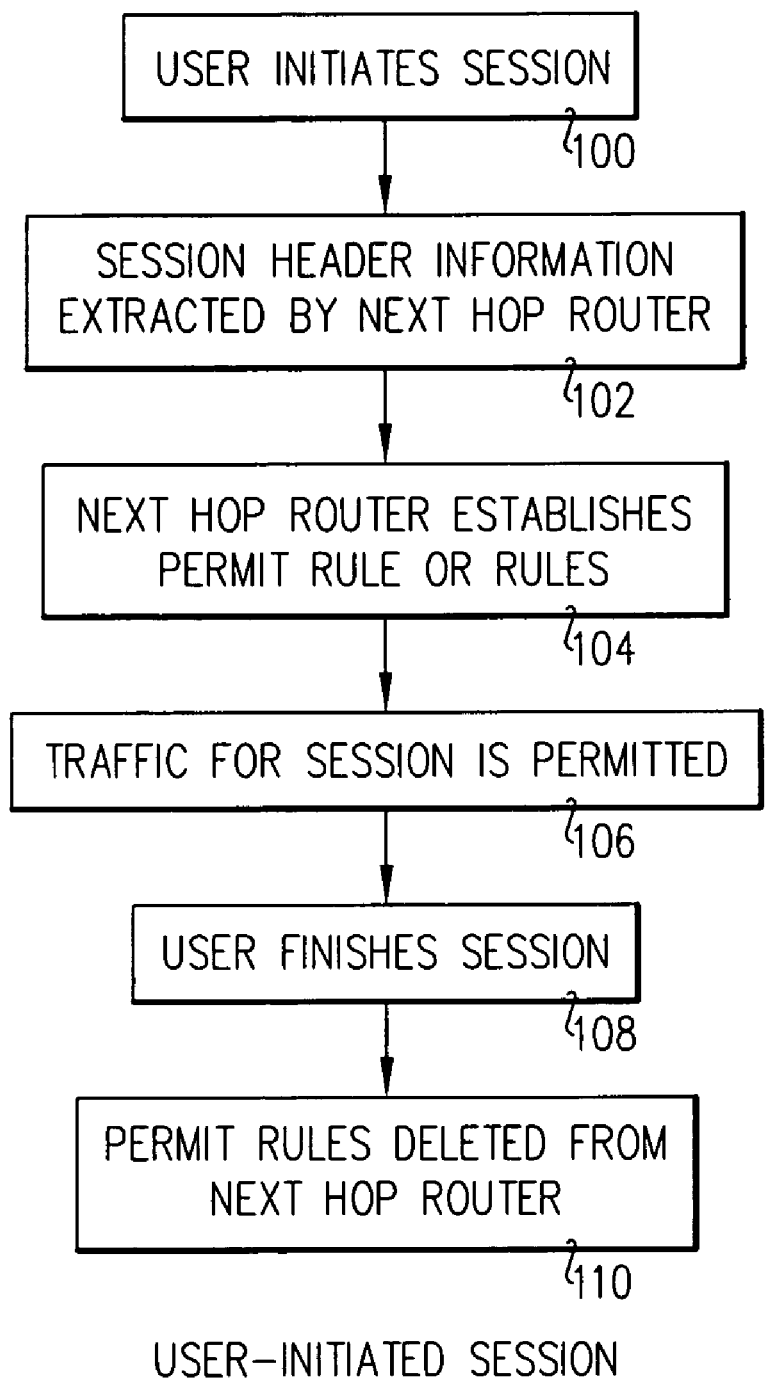
FIG. 5 is a flow chart representation of a user-initiated session.

In accordance with the preferred embodiment of the invention, referring to FIG. 5, broadband home or small business network connections are established as follows.

In step 100 user 30 initiates a session. In step 102, next hop router 50 extracts session header information.

A normal session happens as follows for web browsing: the end user 30 will send a SYN out (that is, a packet with SYN bit 222 set) to a particular DNS lookup for a particular URL. This SYN sets up an allow rule on the next hop router 50 allowing two-way traffic to the DNS lookup machine and from the source 30 on port 40. After the IP is resolved and sent to the end user, a new SYN is sent to the website desired. The router 50 will see the SYN and enable another allow rule for traffic to the website IP and from the end user on port 80. The allow rule can be torn down by either a timeout or a FIN packet (packet with FIN bit 224 set).

For UDP transactions there will not be a SYN packet nor a FIN packet. These transactions will be initiated with the outgoing traffic and torn down after some time. The same would be true of outgoing ICMP or other protocols. The difference between UDP/TCP and ICMP is that ICMP does not have source and destination ports. In the case of ICMP it would be the entire protocol which is allowed or blocked.

In step 104, next hop router 50 establishes a permit rule or rules using the header information from step 102.

Permit rules are rules that are set when an end user initiates an outbound session. When the end user is web browsing, the connection will have the end user's source address (SA) and the web sites destination address (DA), with a randomly chosen source port (SP), a destination port (DP) of 80 and a protocol of TCP (6). The rule could then be (if specificity is desired) allow all traffic to and from SA and DA involving port 80 on the DA (not the end user). This is because any returned traffic will have the SA switched with DA and SP switched with DP.

On the other hand, discard rules are anything that isn't explicitly identified in the permit rules table. All traffic is blocked by default.

In step 106, traffic for the session initiated in step 100 is permitted using these rules, which are based on IP addresses, as well as physical ports, as well as a particular usage of a service. This information can be found in Layer 4 on the OSI model.

In step 108, user 30 finishes this session, and in step 110 the permit rules 56 for this session are deleted from next hop router 50. This action is, in this example, automatically executed in the transport layer 164 of router 50. However, administrative tasks could be included that are manual. These could include the reset of all rules (that is, a "block all, except router communication" rule).

Figure 6:
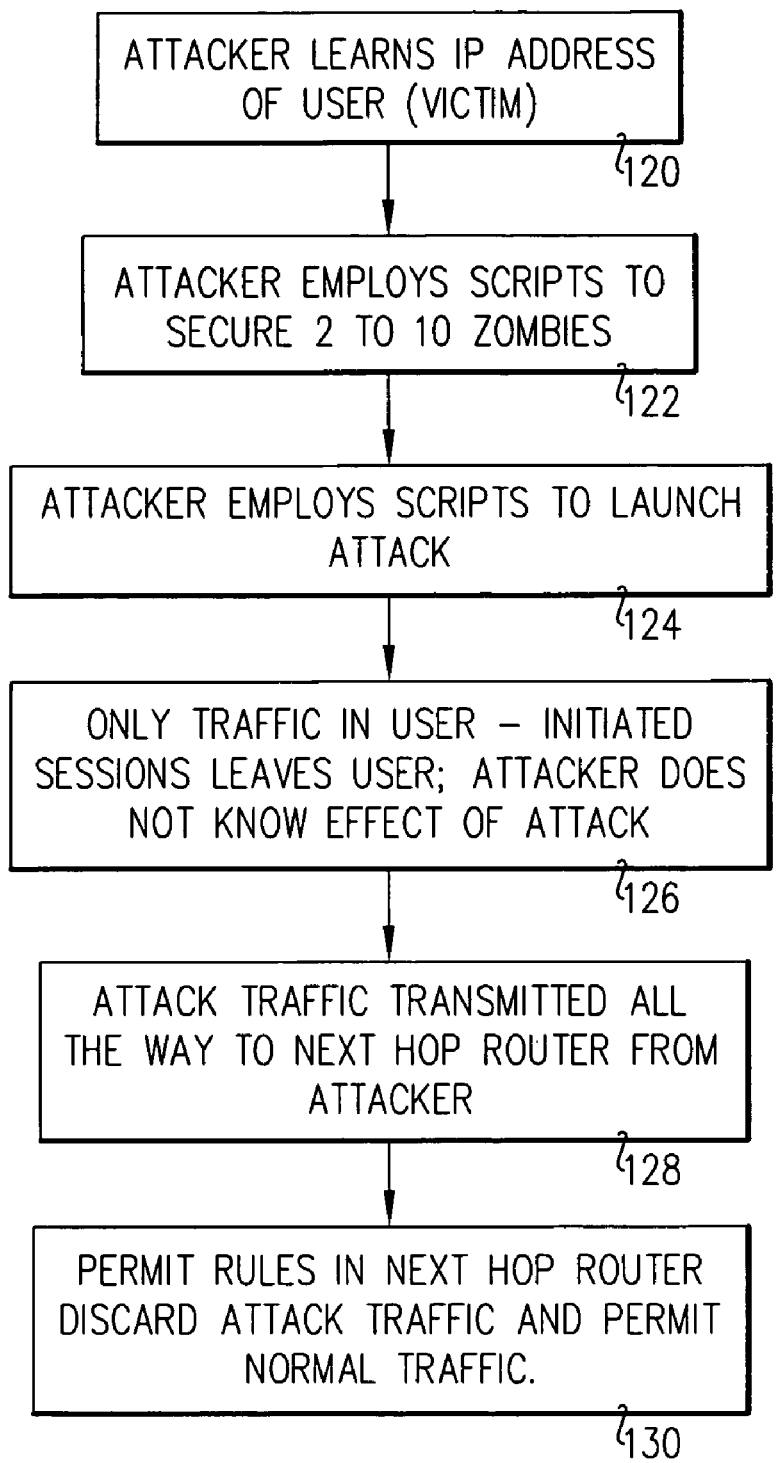
FIG. 6 is a flow chart representation of a small scale attack.

Referring to FIG. 6, by way of example, a small-scale attack may be processed as follows. In step 120, an attacker, say user 36, learns the IP address of user 30, the victim. In step 122, attacker 36 employs scripts to secure two to ten zombies.

A zombie is any machine that has a vulnerability exploited or otherwise allows unauthorized access to a user not allowed by the legitimate owner. This zombie machine can then be used to send spam or launch DoS attacks against others. There are many scripts available online that can exploit vulnerable applications or operating systems. With a basic knowledge of these exploits a malicious user can target specific or indiscriminate machines and build an army of machines available for conducting an attack.

Any of the recent worms or viruses would be examples of scripts that create zombies. These attacks, like Netsky, Bagle, or Mydoom, commonly open a port that allows a master controller to send clandestine commands to the subverted machines without the legitimate owner's knowledge.

Several ways may be employed to learn the IP address of an intended victim. For example, rogue administrators have access to IP addresses. Other possibilities include sniffing on a network and network scanning. Another possibility is lists of IP addresses obtained by other malicious users in the past. These can sometimes be sold to new malicious users trying to build their own zombie army.

In step 124, attacker 36 employs the scripts from step 122 to launch the attack on victim 30. The scripts referenced in subsequent steps refer to different scripts. There are scripts used to obtain zombies and then there are scripts that initiate a DDOS utilizing a zombie army against a target. This second type of scripting (DDoSing) can also be easily found on the Internet and modified with minimal skill.

In step 126 only traffic in user-initiated sessions leaves user 30, such that attacker 36 cannot learn of the effect of the attack. In step 128, attack traffic is transmitted all the way to next hop router 50 from attacker 36 through links 81, 62, 70, 60, and 80. All the while, in step 128, next hop router 50 does not allow through to node 30 traffic not initiated by node 30. This means that node 30 never sees the attack traffic and, therefore, cannot respond to it.

In order to distinguish attack packets from legitimate packets, network layer 163 of next hop router references source address 47 and destination address 49 from 5-Tuple list 68 together with the destination port 204 from TCP header 198 including the destination port (DP) 204 and packet settings, such as SYN 222, FIN 224, and ACK 216, in transport layer 164. A 5-tuple includes or references source address (SA), destination address (DA), protocol, source port (SP) and destination port (DP). If the protocol is ICMP, then there are no SPs or DPs, so they can either be "0"s or have the type in lieu of the SP and "0" for the DP.

The network layer 163 and transport layer 164 on the OSI stack are used in the following way: protocols and addresses are specified on the 3rd level and port numbers are specified on the fourth. Therefore, in order to get the 5-Tuple, the 3rd and 4th layers on the OSI stack are examined.

User 30 initiated sessions will have the known allocated IP from list 66 as the source address and attacks will have some other address as the source address.

In step 130, permit rules in next hop router 50 discard attack traffic and permit normal traffic. Thus, all traffic is blocked by the next hop router, except that traffic which is user-initiated or which is authorized by port knocking.

Port knocking utilizes the idea of a shared secret to allow external users to connect to the system which (by default) only allows user-initiated connections. In order for port knocking to work in the context of the present invention, it would be tracked on a router, because the router doesn't let traffic through unless there is a rule setup.

Figure 7:
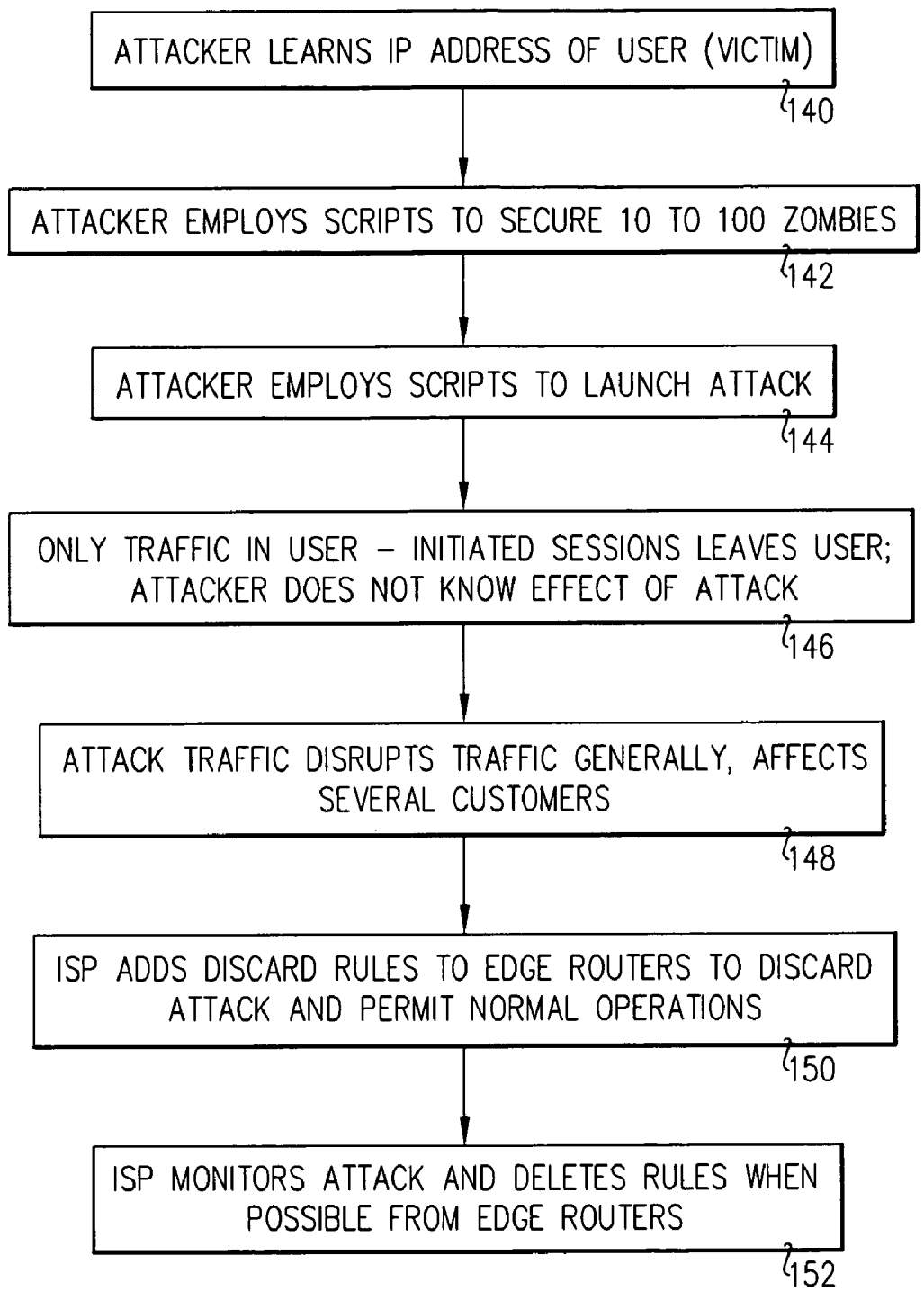
FIG. 7 is a flow chart representation of a medium scale attack.

Referring to FIG. 7, a medium-scale attack is processed as follows.

In step 140, attacker 36 learns the IP address of user 30, the victim.

In step 142, attacker 36 employs scripts to secure ten to a hundred zombies.

In step 144, attacker 36 employs scripts to launch attack on victim 30.

In step 146, only traffic in user 30-initiated sessions leaves user 30, such that attacker 36 does not learn the effect of its attack on victim 30.

In step 148, attack traffic disrupts ISP 70 traffic generally, affecting several customers, including users 30-34.

In step 150, ISP 70 adds discard rules to edge routers 60, 61, 62 to discard attack traffic and permit normal operations.

In step 152, ISP 70 monitors attack and deletes the rules of step 150 from edge routers 60, 61, 62 when the attack of step 144 subsides.

A medium-scale attack (FIG. 7) is closer to a small-scale attack (FIG. 6) than to a large-scale attack by normal standards. A large-scale attack would use many thousands of zombies, responding to which is beyond the scope of this invention.

When referring to blocking measures at higher levels, it is assumed that there is no way to automatically defeat a large DDOS. Therefore, although the DDOS would be quite noticeable, a human would have to enact some mitigation measure. The present invention would not be practical in this large-scale case, because there would be too many permit rules 56 being created and torn down at any time.

In yet another exemplary embodiment, instead of ISP 70 taking direct action at the edge routers (step 150), ISP 70 could implement a permit list 56 of clients to specific clients or a block list 54 from offending clients. The benefit of this would be automatic response as opposed to human effort.

Figure 8:
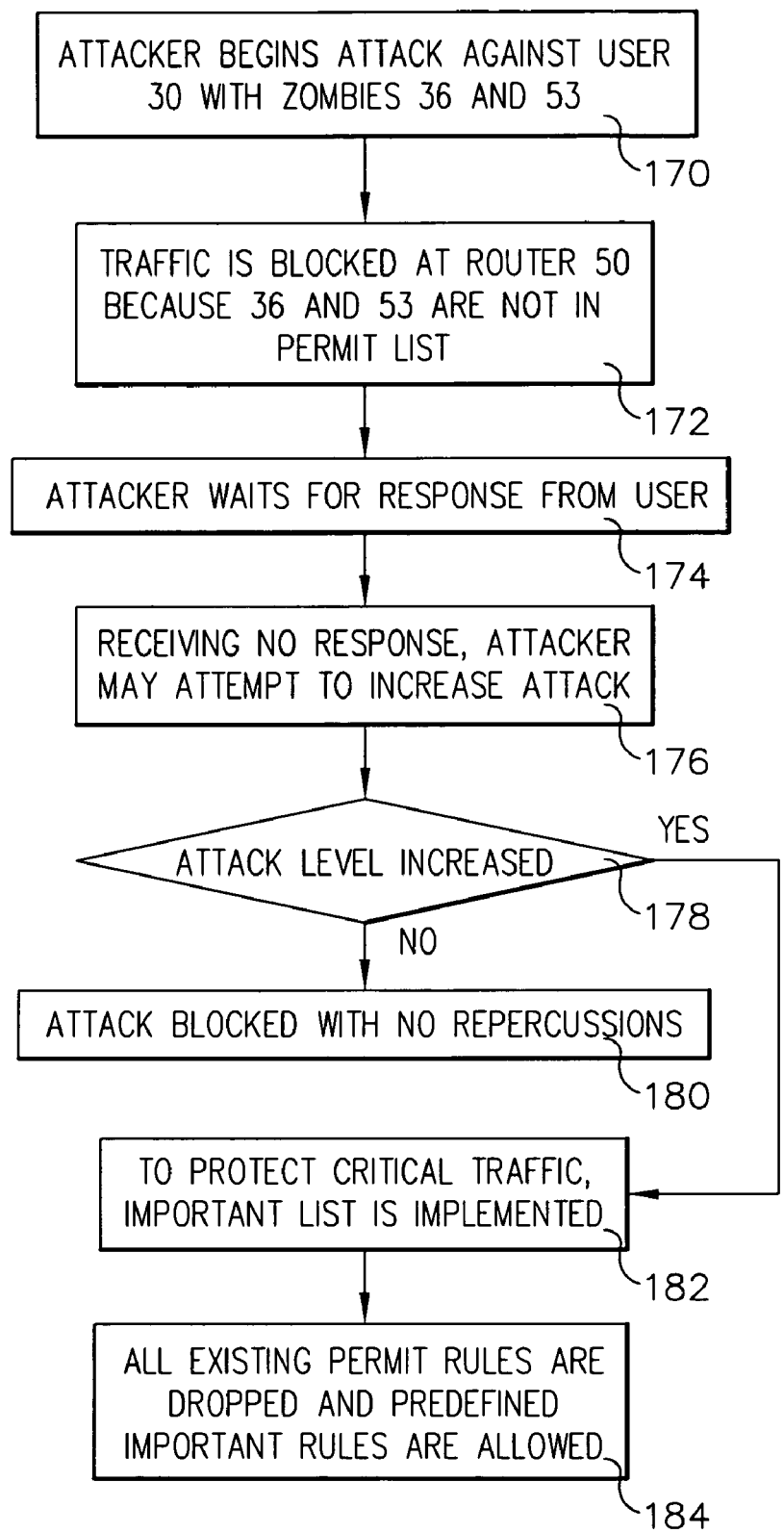
FIG. 8 is a flow chart representation of an attack in progress.

Referring to FIG. 8, an exemplary process executed at router 50, responds to an attack in progress as follows. In step 170, an attacker begins the attack against user 30 with zombies executing at attack system 36 and from a system (not shown) outboard of next hop router 51.

In step 172, traffic reaching next hop router 50 via link 80 from zombies at 36 and 53 is blocked because nodes 36 and 53 are not in permit list 56.

In step 174, the attacker waits for a response from user 30, and not receiving one may chose in step 176 to increase the level of attack. If the attack level is not increased, in step 180 the attack continues to be blocked without further repercussions. However, if in step 178 an increased attack level is detected by next hop router 50, then in step 182 important list 58 rules are implemented while, in step 184, all existing permit rules 56 are dropped and only important rules 58 are allowed. The important list is a "white list" of rules that have the purpose of allowing always a certain protocol, service or address (range).

Figure 9:
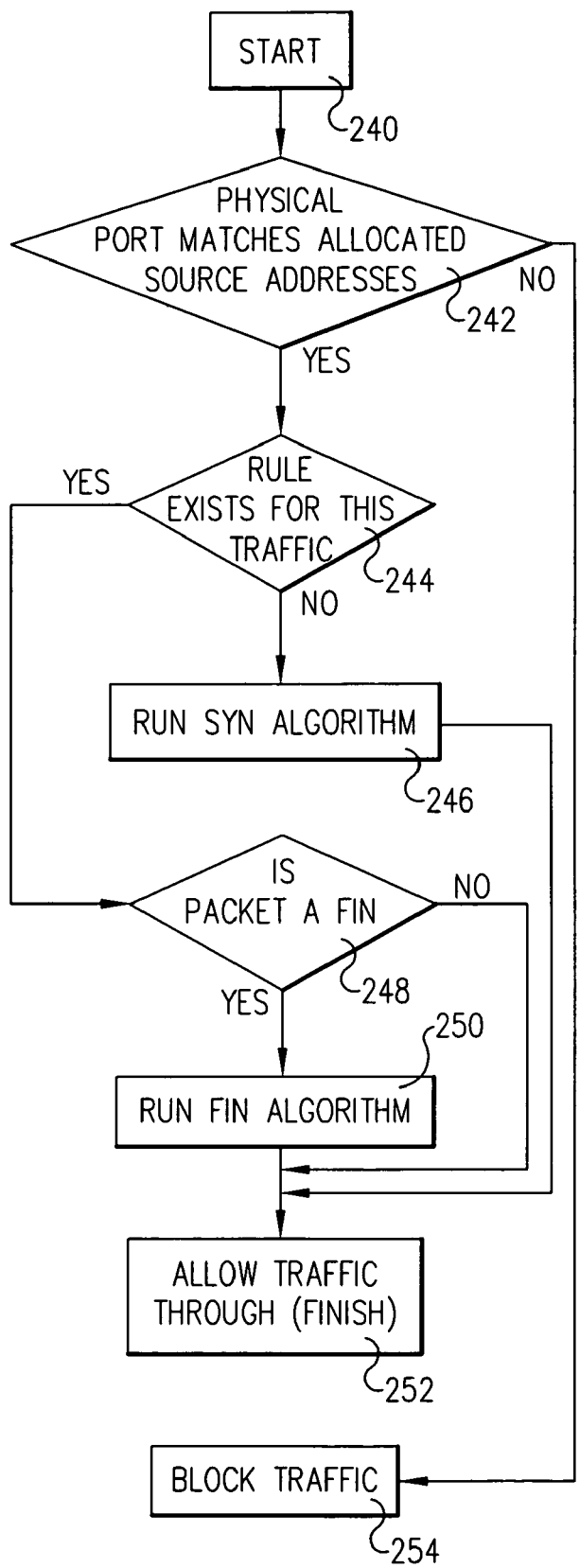
FIG. 9 is a flow chart representation of a process executing at the next hop router of FIG. 1.

As previously stated, in a preferred embodiment of the invention, execution of the steps of the invention occurs at next hop router 50. At the router 50 level, there is an inspection of packets that come across. Referring to FIG. 9, the basic process executing at next hop router 50 is illustrated.

Figure 10:
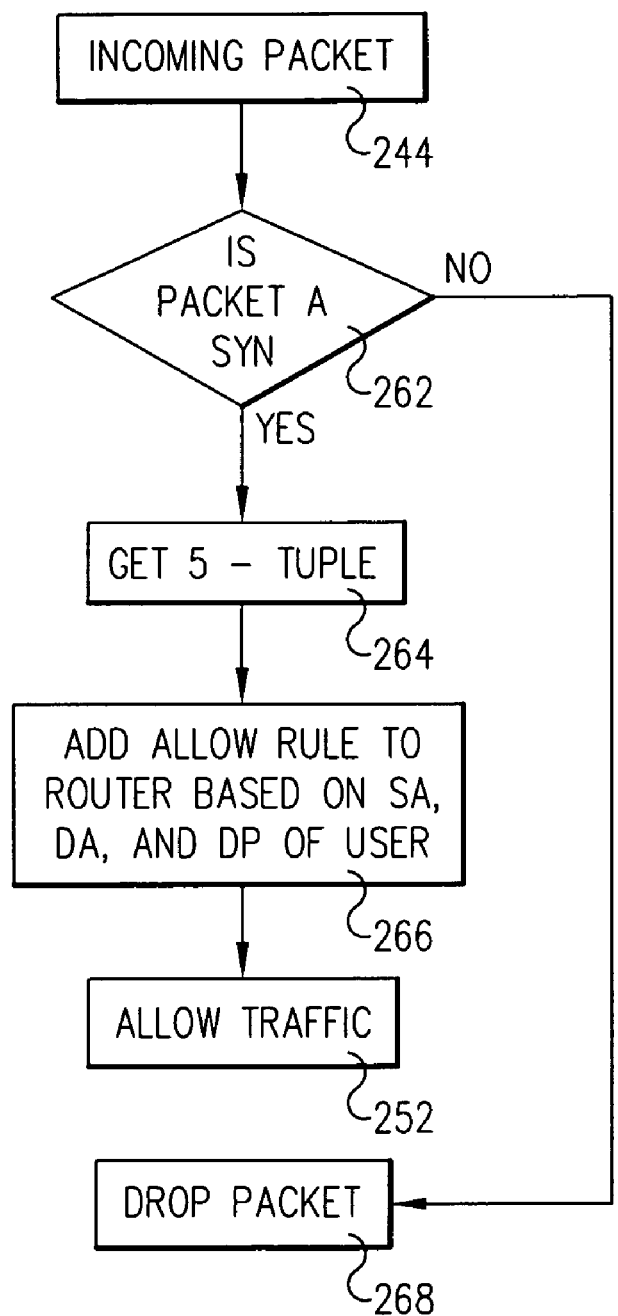
FIG. 10 is a flow chart representation of processing a synchronization (SYN) packet.

The algorithm begins execution at start 240 and in step 242 determines if the physical port 200 on an incoming packet 198 matches an allocated source address 66. If not, in step 254 the received packet is blocked. If so, in step 244 permit rule list 56 is accessed to determine if a rule exists for this traffic (that is, received packet 198). If so, the SYN algorithm of FIG. 10 is executed. If not, in step 248 router 50 determines if received packet 198 is a FIN packet (a packet with FIN 224, or the equivalent, set), indicating that no more data will be forthcoming from the originator of this packet 198. If this packet 198 is a FIN packet, then in step 250, the FIN algorithm of FIG. 11 is executed.

Referring to FIG. 10, the SYN algorithm of step 246 is executed at next hop router 50 by determining in step 262 if incoming packet 244 is a SYN packet (a packet 198 with SYN bit 222 set). Sequence number 206 is the sequence number of the first data octet in this segment (TCP segment is sent as an Internet datagram 198) unless SYN 222 is set, in which event sequence number 206 is the initial sequence number (ISN), or the sequence number of the first datagram 198 of this session) and the first data octet 236 is ISN+1.

If this packet 198 is a SYN packet, then in step 264 5-tuple 68 is obtained, in step 266 an allow rule is added to list 56 based on source address, destination address, and destination port 204 of user 30 from 5-tuple 68, and in step 252 this traffic is allowed. If in step 262 it is determined that this packet 198 is not a SYN packet, then in step 268 it is dropped.

Figure 11:
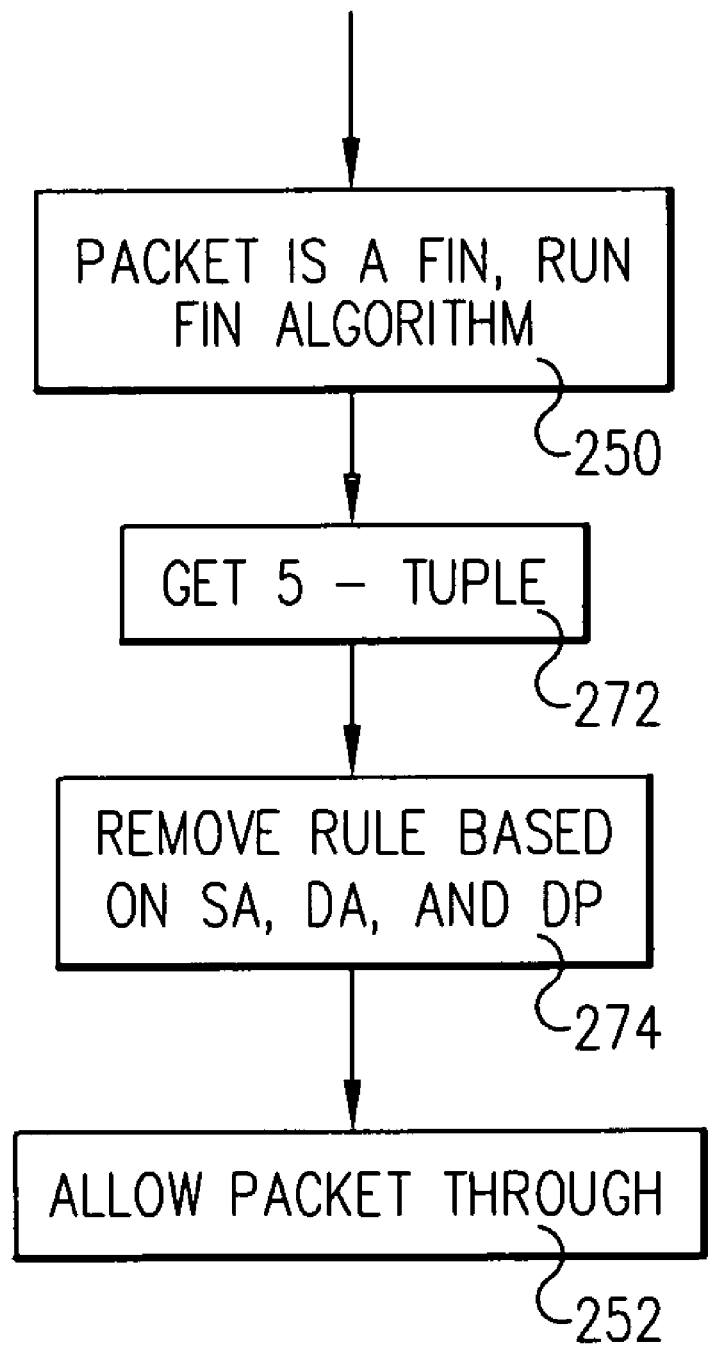
FIG. 11 is a flow chart representation of processing of a finish (FIN) packet.

Referring to FIG. 11, which describes a tear-down process, if in step 248 of FIG. 9 it was determined that this packet 198 is a FIN packet, then in step 250 the FIN algorithm is executed, including in step 272 obtaining the 5-tuple from 5-tuple list 62 for this user, in step 274 deleting the permit rule for this user 30 from permit rules list 56, and in step 252 allowing this packet through.

Referring again to FIG. 9, in step 252, this packet 198 is allowed through to finish the session.

In accordance with a further embodiment of the invention, the process or algorithm could be extended to an automated or manual process where a larger, more obvious attack could have discard rules at a higher bandwidth node (like an edge router of an ISP).

As described above, the present invention pertains to enhancement of a next hop router 50 with a high bandwidth link 80 on the ISP 70 side and multiple DSL or other relatively low bandwidth links 40-44 on the other.

In accordance with a further embodiment of the invention, a key requirement is that the only congestion point 50 during a small-scale DDOS attack with traffic from ISP 70 to a small office or home 30 substantially consume the bandwidth of the low bandwidth link 40. That is, the high bandwidth link 80 has sufficient capacity to transmit all packets to the router 50, including both normal and malicious traffic, and the processing power of router 50 be sufficient to transmit all normal packets destined to a low bandwidth link 40 and drop sufficiently fast the malicious traffic. The congestion point, in other words, should be the transmission rate of the low bandwidth link 40.

A congestion point is the point at which the attack traffic will travel along with normal traffic, possibly influencing one or more end users. Next hop router 50 needs to be able to handle both normal traffic as well as a surge of traffic (malicious) against a user. High bandwidth link 80 should be approximately the summation of the medium bandwidth links 40-44.

In a further alternative embodiment, the present invention is applied to other devices with two sides (similar to router 50, which has two sides 80 and 40). The existence of sides is defined by the case that most or all traffic through a device goes from one side to the other. One side has only one or a few relatively high bandwidth links 80. The other side has many links 40-44 with relatively low bandwidth. For example, the low bandwidth links 40-44 could be telephone modem connections. It is necessary that the selected low bandwidth link 40 is the one and only congestion point for traffic going from the high bandwidth link 80, through the device 50, and then into the low bandwidth link 40. Such a process or device 50 may be utilized, for example, by a telephone company at some infrastructure point. This device would also run a process to prevent traffic not initiated by the end user. Example of such device include DSLAM (DSL Aggregation Module) for DSL connections or Cable Head-End for Cable Modem connections. These alternative devices act the same way as the next-hop router 50 to which the victim 30 is attached.

In accordance with a further embodiment, care is taken not to reveal to the attacker 36 that one or a few important (that is, vital, key, significant, essential, high value, or the like) sessions from the home or office 30 continue to be functional. Thus, upon detection of an attack (such as by statistical analysis of traffic patterns) at next hop router 50, router 50 may notify the home or office 30. The home or office 30 may then voluntarily suspend all traffic except that of high value (such as work traffic from a telecommuter). Router 50 keeps track of certain traffic statistics, such as: number of packets 198 in and out, number of bytes in and out, and these statistics broken down by physical port. Using the traffic analysis statistics currently bundled in routers 50, an unusual amount or type of traffic destined to a home user 30 may be detected.

Alternatively, with pre-approval from the home or office 30, an automatic mechanism in next hop router 50 may drop all traffic in both directions during an attack except traffic in a short, important list. Important list 58 identifies traffic that is always to be allowed, such as traffic that is through a VPN to a work location or some other traffic deemed critical by the end user. The objective in any case is to deny the attacker knowledge that vital communications with the home or office 30 continue, lest the attacker 36 simply enlist more zombies and finally succeed in denying service to the home or office 30.

Alternative Embodiments

Figure 12:
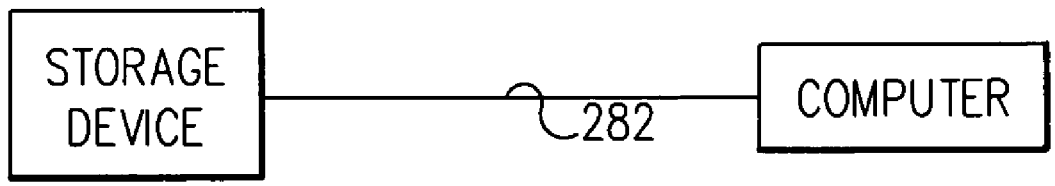
FIG. 12 is a diagrammatic representation of a program storage device readable by a computer for executing the method of the invention.

It will be appreciated that, although specific embodiments of the invention have been described herein for purposes of illustration, various modifications may be made without departing from the spirit and scope of the invention. Referring to FIG. 12, in particular, it is within the scope of the invention to provide a computer program product or program element, or a program storage or memory device such as a solid or fluid transmission medium 282, magnetic or optical wire, tape or disc 280, or the like, for storing signals readable by a machine, for controlling the operation of a computer 284 according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for detecting and mitigating denial of service attacks, comprising:
    initiating a computer communication session on a communication network between a receiving computer and a sending computer on a network;
    executing in a router a set of permit rules for permitting flow of communication packets for user-initiated sessions through said router to the receiving computer;
    in response to the receiving computer being a victim of an attack by the sending computer, sending an attack notification to an administrator;
    establishing a low bandwidth link between said receiving computer and a next hop router;
    establishing a high bandwidth link between said next hop router and an edge router to an Internet service provider (ISP) network, wherein the low bandwidth link has a lower bandwidth than the high bandwidth link;
    permitting said next hop router to handle both valid and invalid traffic between said next hop router and said ISP network via the high bandwidth link, wherein said invalid traffic is from the attack by the sending computer;
    establishing said low bandwidth link as a one and only congestion point for traffic going from the ISP network to the receiving computer;
    establishing timing out rules that time out permit rules, wherein the permit rules permitted communication with said receiving computer before termination of a transaction session;
    establishing a sequence of exotic port numbers for identifying at least one trusted computer for communication with said receiving computer irrespective of said permit rules, wherein all of the exotic port numbers have values less than a predetermined number;
    operating a plurality of small computers that each utilize an instantiation of said low bandwidth link to said next hop router;
    recording origination of each session in said next hop router for preventing spoofing of a source of traffic directed to said small computers by other computers;
    responsive to initiation of an outbound session by said small computers, operating said next hop router to extract session header information including source address and destination address provided by said small computers;
    responsive to said session header information, said next hop router establishing at least one permit rule;
    responsive to said outbound session terminating, deleting said permit rule;
    maintaining a list of destination devices that have been predetermined to be critical to a selected user computer;
    monitoring attack levels experienced at said next hop router with respect to said selected user computer;
    responsive to detecting an increasing attack level directed to said selected user computer, utilizing said list of destination devices that have been predetermined to be critical to said selected user computer in order to drop all existing permit rules with respect to said selected user computer and to allow only other rules that have been pre-established for said selected user computer;
    determining if a physical port on an incoming packet matches an allocated source address, and if not, blocking said incoming packet;
    if said incoming packet is not blocked, determining if a permit rule exists for said incoming packet, and if not, executing a synchronization algorithm to establish said permit rule based on source address, destination address, and destination port of said small computers; and
    if said permit rule exists for an incoming packet which is a finish packet, then in response to the receiving computer receiving said finish packet, executing a finish algorithm to remove said permit rule and to allow said finish packet through said next hop router, wherein the finish packet indicates that no more data will be forthcoming from an originator of said finish packet, and wherein the finish algorithm:
    obtains a 5-tuple from a 5-tuple list for said selected user, wherein the 5-tuple list identifies trusted packets for said selected user, and wherein the 5-tuple includes and identifies a source Internet Protocol (IP) address of said incoming packet, a destination IP address for said incoming packet, a source port for said incoming packet, a destination port for said incoming packet, and a protocol for said incoming packet;
    deletes said permit rules for said selected user; and
    allows said finish packet through to finish said computer communication session.

2. A computer program product for detecting and mitigating denial of service attacks, the computer program product comprising:
    a non-transitory computer readable storage device;
    first program instructions to initiate a computer communication session on a communication network between a receiving computer and a sending computer on a network;
    second program instructions to execute in a router a set of permit rules for permitting flow of communication packets for user-initiated sessions through said router to the receiving computer;
    third program instructions to, in response to the receiving computer being a victim of an attack by the sending computer, send an attack notification to an administrator;

fourth program instructions to establish a low bandwidth link between said receiving computer and a next hop router;

fifth program instructions to establish a high bandwidth link between said next hop router and an edge router to an Internet service provider (ISP) network, wherein the low bandwidth link has a lower bandwidth than the high bandwidth link;

sixth program instructions to permit said next hop router to handle both valid and invalid traffic between said next hop router and said ISP network via the high bandwidth link, wherein said invalid traffic is from the attack by the sending computer;

seventh program instructions to establish said low bandwidth link as a one and only congestion point for traffic going from the ISP network to the receiving computer;

eighth program instructions to establish timing out rules that time out permit rules, wherein the permit rules permitted communication with said receiving computer before termination of a transaction session;

ninth program instructions to establish a sequence of exotic port numbers for identifying at least one trusted computer for communication with said receiving computer irrespective of said permit rules, wherein all of the exotic port numbers have values less than a predetermined number;

tenth program instructions to operate a plurality of small computers that each utilize an instantiation of said low bandwidth link to said next hop router;

eleventh program instructions to record origination of each session in said next hop router for preventing spoofing of a source of traffic directed to said small computers by other computers;

twelfth program instructions to, responsive to initiation of an outbound session by said small computers, operate said next hop router to extract session header information including source address and destination address provided by said small computers;

thirteenth program instructions to, responsive to said session header information, establish at least one permit rule in said next hop router;

fourteenth program instructions to, responsive to said outbound session terminating, delete said permit rule;

fifteenth program instructions to maintain a list of destination devices that have been predetermined to be critical to a selected user computer;

sixteenth program instructions to monitor attack levels experienced at said next hop router with respect to said selected user computer;

seventeenth program instructions to, responsive to detecting an increasing attack level directed to said selected user computer, utilize said list of destination devices that have been predetermined to be critical to said selected user computer in order to drop all existing permit rules with respect to said selected user computer and to allow only other rules that have been pre-established for said selected user computer;

eighteenth program instructions to determine if a physical port on an incoming packet matches an allocated source address, and if not, to block said incoming packet;

nineteenth program instructions to, if said incoming packet is not blocked, determine if a permit rule exists for said incoming packet, and if not, to execute a synchronization algorithm to establish said permit rule based on source address, destination address, and destination port of said small computers; and twentieth program instructions to, if said permit rule exists for an incoming packet which is a finish packet, then in response to the receiving computer receiving said finish packet, execute a finish algorithm to remove said permit rule and to allow said finish packet through said next hop router, wherein the finish packet indicates that no more data will be forthcoming from an originator of said finish packet, and wherein the finish algorithm:

obtains a 5-tuple from a 5-tuple list for said selected user, wherein the 5-tuple list identifies trusted packets for said selected user, and wherein the 5-tuple includes and identifies a source Internet Protocol (IP) address of said incoming packet, a destination IP address for said incoming packet, a source port for said incoming packet, a destination port for said incoming packet, and a protocol for said incoming packet;

deletes said permit rules for said selected user; and allows said finish packet through to finish said computer communication session; and wherein the first, second, third, fourth, fifth, sixth, seventh, eighth, ninth, tenth, eleventh, twelfth, thirteenth, fourteenth, fifteenth, sixteenth, seventeenth, eighteenth, nineteenth, and twentieth program instructions are stored on the non-transitory computer readable storage device.

3. A computer system comprising:

a processor, a system memory, and a non-transitory computer readable storage device;

first program instructions to initiate a computer communication session on a communication network between a receiving computer and a sending computer on a network;

second program instructions to execute in a router a set of permit rules for permitting flow of communication packets for user-initiated sessions through said router to the receiving computer;

third program instructions to, in response to the receiving computer being a victim of an attack by the sending computer, send an attack notification to an administrator;

fourth program instructions to establish a low bandwidth link between said receiving computer and a next hop router;

fifth program instructions to establish a high bandwidth link between said next hop router and an edge router to an Internet service provider (ISP) network, wherein the low bandwidth link has a lower bandwidth than the high bandwidth link;

sixth program instructions to permit said next hop router to handle both valid and invalid traffic between said next hop router and said ISP network via the high bandwidth link, wherein said invalid traffic is from the attack by the sending computer;

seventh program instructions to establish said low bandwidth link as a one and only congestion point for traffic going from the ISP network to the receiving computer;

eighth program instructions to establish timing out rules that time out permit rules, wherein the permit rules permitted communication with said receiving computer before termination of a transaction session;

ninth program instructions to establish a sequence of exotic port numbers for identifying at least one trusted computer for communication with said receiving computer irrespective of said permit rules, wherein all of the exotic port numbers have values less than a predetermined number;

tenth program instructions to operate a plurality of small computers that each utilize an instantiation of said low bandwidth link to said next hop router;

eleventh program instructions to record origination of each session in said next hop router for preventing spoofing of a source of traffic directed to said small computers by other computers;

twelfth program instructions to, responsive to initiation of an outbound session by said small computers, operate said next hop router to extract session header information including source address and destination address provided by said small computers;

thirteenth program instructions to, responsive to said session header information, establish at least one permit rule in said next hop router;

fourteenth program instructions to, responsive to said outbound session terminating, delete said permit rule;

fifteenth program instructions to maintain a list of destination devices that have been predetermined to be critical to a selected user computer;

sixteenth program instructions to monitor attack levels experienced at said next hop router with respect to said selected user computer;

seventeenth program instructions to, responsive to detecting an increasing attack level directed to said selected user computer, utilize said list of destination devices that have been predetermined to be critical to said selected user computer in order to drop all existing permit rules with respect to said selected user computer and to allow only other rules that have been pre-established for said selected user computer;

eighteenth program instructions to determine if a physical port on an incoming packet matches an allocated source address, and if not, to block said incoming packet;

nineteenth program instructions to, if said incoming packet is not blocked, determine if a permit rule exists for said incoming packet, and if not, to execute a synchronization algorithm to establish said permit rule based on source address, destination address, and destination port of said small computers; and twentieth program instructions to, if said permit rule exists for an incoming packet which is a finish packet, then in response to the receiving computer receiving said finish packet, execute a finish algorithm to remove said permit rule and to allow said finish packet through said next hop router, wherein the finish packet indicates that no more data will be forthcoming from an originator of said finish packet, and wherein the finish algorithm:

obtains a 5-tuple from a 5-tuple list for said selected user, wherein the 5-tuple list identifies trusted packets for said selected user, and wherein the 5-tuple includes and identifies a source Internet Protocol (IP) address of said incoming packet, a destination IP address for said incoming packet, a source port for said incoming packet, a destination port for said incoming packet, and a protocol for said incoming packet;

deletes said permit rules for said selected user; and allows said finish packet through to finish said computer communication session; and wherein the first, second, third, fourth, fifth, sixth, seventh, eighth, ninth, tenth, eleventh, twelfth, thirteenth, fourteenth, fifteenth, sixteenth, seventeenth, eighteenth, nineteenth, and twentieth program instructions are stored on the non-transitory computer readable storage device for execution by the processor via the system memory.

* * * * *